(12) United States Patent
Tsurugaya et al.

(10) Patent No.: US 12,542,421 B2
(45) Date of Patent: Feb. 3, 2026

(54) OPTICAL DEVICE

(71) Applicant: NTT, Inc., Tokyo (JP)

(72) Inventors: Takuma Tsurugaya, Tokyo (JP); Shinji Matsuo, Tokyo (JP); Koji Takeda, Tokyo (JP); Takuro Fujii, Tokyo (JP)

(73) Assignee: NTT, INC., Tokyo (JP)

( * ) Notice: Subject to any disclaimer, the term of this patent is extended or adjusted under 35 U.S.C. 154(b) by 722 days.

(21) Appl. No.: 17/911,714

(22) PCT Filed: Mar. 23, 2020

(86) PCT No.: PCT/JP2020/012660
§ 371 (c)(1),
(2) Date: Sep. 15, 2022

(87) PCT Pub. No.: WO2021/191953
PCT Pub. Date: Sep. 30, 2021

(65) Prior Publication Data
US 2023/0122118 A1   Apr. 20, 2023

(51) Int. Cl.
*H01S 5/11* (2021.01)
*H01S 5/042* (2006.01)
*H01S 5/22* (2006.01)

(52) U.S. Cl.
CPC .............. *H01S 5/11* (2021.01); *H01S 5/0424* (2013.01); *H01S 5/22* (2013.01)

(58) Field of Classification Search
CPC .................................. H01S 5/11; H01S 5/0424
See application file for complete search history.

(56) References Cited

U.S. PATENT DOCUMENTS

| | | | | |
|---|---|---|---|---|
| 5,682,401 A | * | 10/1997 | Joannopoulos | H01S 5/1028 372/99 |
| 7,603,016 B1 | * | 10/2009 | Soref | B82Y 20/00 385/129 |
| 8,798,414 B2 | * | 8/2014 | Quan | B82Y 20/00 385/10 |
| 2005/0111511 A1 | * | 5/2005 | Assefa | H01S 5/10 372/92 |

(Continued)

FOREIGN PATENT DOCUMENTS

| | | |
|---|---|---|
| CN | 108199260 A | 6/2018 |
| JP | 2005005502 A | 1/2005 |

OTHER PUBLICATIONS

Zain et al., "Design and Fabrication of High Quality-Factor 1-D Photonic Crystal/Photonic Wire Extended Microcavities" IEEE Photonics Technology Letters, vol. 22, No. 9, May 1, 2010, pp. 610-612 (3 pages). As discussed in the specification.

*Primary Examiner* — James A Menefee
(74) *Attorney, Agent, or Firm* — Slater Matsil, LLP (57) ABSTRACT

An optical device includes a first reflecting section, a second reflecting section, and a confining section. The first reflecting section is constituted of a thin-wire waveguide-type one-dimensional photonic crystal. The second reflecting section is constituted of a thin-wire waveguide-type one-dimensional photonic crystal of which a lattice constant differs from that of the first reflecting section. The confining section is sandwiched between the first reflecting section and the second reflecting section. A Fabry-Perot optical resonator is constituted by the first reflecting section, the confining section, and the second reflecting section.

16 Claims, 8 Drawing Sheets

(56) References Cited

U.S. PATENT DOCUMENTS

| | | | |
|---|---|---|---|
| 2006/0050744 A1* | 3/2006 | Wong | H01S 3/302 |
| | | | 372/3 |
| 2015/0212266 A1* | 7/2015 | Czornomaz | G02B 6/1225 |
| | | | 438/31 |
| 2015/0372455 A1* | 12/2015 | Nam | H01S 5/3223 |
| | | | 438/22 |
| 2018/0175585 A1* | 6/2018 | Crosnier | H01S 5/11 |
| 2020/0303890 A1* | 9/2020 | Kim | H01S 5/4062 |

* cited by examiner

OPTICAL DEVICE

CROSS-REFERENCE TO RELATED APPLICATIONS

This application is a national phase entry of PCT Application No. PCT/JP2020/012660, filed on Mar. 23, 2020, which application is hereby incorporated herein by reference.

TECHNICAL FIELD

The present invention relates to an optical device using a thin-wire waveguide-type one-dimensional photonic crystal.

BACKGROUND

An optical waveguide made of a thin-wire waveguide-type photonic crystal with periodically formed holes in a one-dimensional configuration (a one-dimensional photonic crystal) enables strong optical confinement into an extremely small region in the scale of μm. It is anticipated that this optical waveguide structure will be applied to ultrasmall laser diodes, photodiodes, and the like which operate with extremely low power. For example, a Fabry-Perot resonator which comprises a one-dimensional photonic crystal as reflecting section and in which a confining section is sandwiched between two reflecting sections has been studied and developed (refer to NPL 1). This technique enables optical confinement to be performed into a region in the scale of several μm which is sandwiched between two reflecting sections each made of a one-dimensional photonic crystal and enables an optical resonator which is minute (in the scale of several μm) and which has a high Q factor (a Q factor reaching the order of $10^4$) to be realized.

CITATION LIST

Non Patent Literature

[NPL 1] Ahmad Rifqi Md Zain et al., "Design and Fabrication of High Quality-Factor 1-D Photonic Crystal/Photonic Wire Extended Microcavities", IEEE Photonics Technology Letters, vol. 22, no. 9, pp. 610-612, 2010.

SUMMARY

Technical Problem

In order to realize strong optical confinement, the resonator described above which uses a one-dimensional photonic crystal as a reflecting section generally has an extremely wide stop band (a photonic band gap) in the order of several hundred nm. On the other hand, when a length (resonator length) of the region (the confining section) between the two reflecting sections is several μm, a resonance peak interval (FSR: Free spectral range) is in the order of several ten nm. Therefore, a resonator of which a resonator length is several μm or more inevitably assumes a multi-longitudinal mode. For example, when constructing a semiconductor laser using the resonator, this state means that a plurality of modes with different wavelengths may oscillate and is not favorable in terms of obtaining a single-wavelength oscillation operation which is important in applications such as information communication.

Embodiments of the present invention have been made in order to solve the problem described above and an object thereof is to enable single mode resonance in a resonator using a thin-wire waveguide-type one-dimensional photonic crystal as a reflecting section.

Means for Solving the Problem

An optical device according to embodiments of the present invention includes: a first reflecting section constituted of a thin-wire waveguide-type one-dimensional photonic crystal; a second reflecting section constituted of a thin-wire waveguide-type one-dimensional photonic crystal of which a lattice constant differs from that of the first reflecting section; and a confining section sandwiched between the first reflecting section and the second reflecting section, wherein a Fabry-Perot optical resonator is constituted by the first reflecting section, the confining section, and the second reflecting section.

Effects of Embodiments of the Invention

As described above, according to embodiments of the present invention, since a resonator is constituted by a first reflecting section constituted of a thin-wire waveguide-type one-dimensional photonic crystal and a second reflecting section constituted of a thin-wire waveguide-type one-dimensional photonic crystal of which a lattice constant differs from that of the first reflecting section, a resonator using a thin-wire waveguide-type one-dimensional photonic crystal as a reflecting section enables single mode resonance to be performed.

DETAILED DESCRIPTION OF ILLUSTRATIVE EMBODIMENTS

Figure 1:
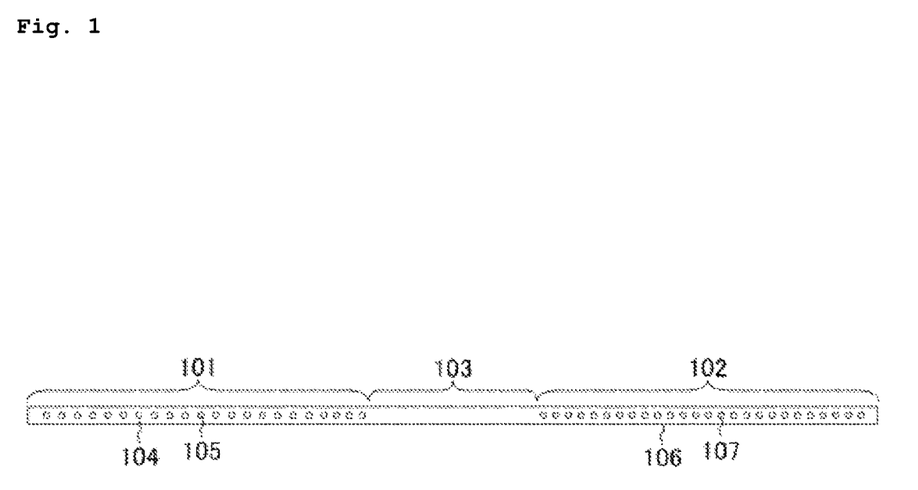
FIG. 1 is a configuration diagram showing a configuration of an optical device according to an embodiment of the present invention.

Hereinafter, an optical device according to an embodiment of the present invention will be described with reference to FIG. 1. The optical device includes a first reflecting section 101, a second reflecting section 102, and a confining section 103.

The first reflecting section 101 is constituted of a thin-wire waveguide-type one-dimensional photonic crystal. The photonic crystal constituting the first reflecting section 101 includes a first base 104 and a first lattice element 105 formed in the first base 104. The first lattice element 105 is linearly and periodically provided at predetermined intervals, has a refractive index which differs from that of the first base 104, and has a columnar (for example, a cylindrical) shape. For example, the first lattice element 105 is a through-hole formed in the first base 104.

The second reflecting section 102 is constituted of a thin-wire waveguide-type photonic crystal (one-dimensional photonic crystal) of which a lattice constant differs from that of the first reflecting section 101. The photonic crystal constituting the second reflecting section 102 includes a second base 106 and a second lattice element 107 formed in the second base 106. The second lattice element 107 is linearly and periodically provided at predetermined intervals, has a refractive index which differs from that of the second base 106, and has a columnar (for example, a cylindrical) shape. For example, the second lattice element 107 is a through-hole formed in the second base 106.

The confining section 103 is arranged so as to be sandwiched between the first reflecting section 101 and the second reflecting section 102. A Fabry-Perot optical resonator is constituted by the first reflecting section 101, the confining section 103, and the second reflecting section 102. For example, the first base 104, the confining section 103, and the second base 106 are integrally formed of a same material, in which case the confining section 103 is a portion where a lattice element is not formed.

The first base 104, the confining section 103, and the second base 106 can be constituted of, for example, InP. An integrated structure constituting the first base 104, the confining section 103, and the second base 106 can be, for example, a core-like structure with a width of 500 nm and a thickness of 250 nm.

In addition, for example, when a resonance wavelength is set to a 1.55 μm band which is suitable for communication applications, a lattice constant of the first reflecting section 101 can be set to 455 nm. Furthermore, a diameter of the first lattice element 105 can be set to 180 nm. A lattice constant of the second reflecting section 102 can be set to 375 nm. Furthermore, a diameter of the second lattice element 107 can be set to 180 nm. Since the first base 104, the confining section 103, and the second base 106 are given a core shape with a thickness of 250 nm, the first lattice element 105 and the second lattice element 107 form a cylinder with a diameter of 180 nm and a height of 250 nmn.

For example, by including a light-emitting unit such as a light-emitting diode constituted of a semiconductor in the confining section 103, the optical device described above can be made into a semiconductor laser.

Figure 2:
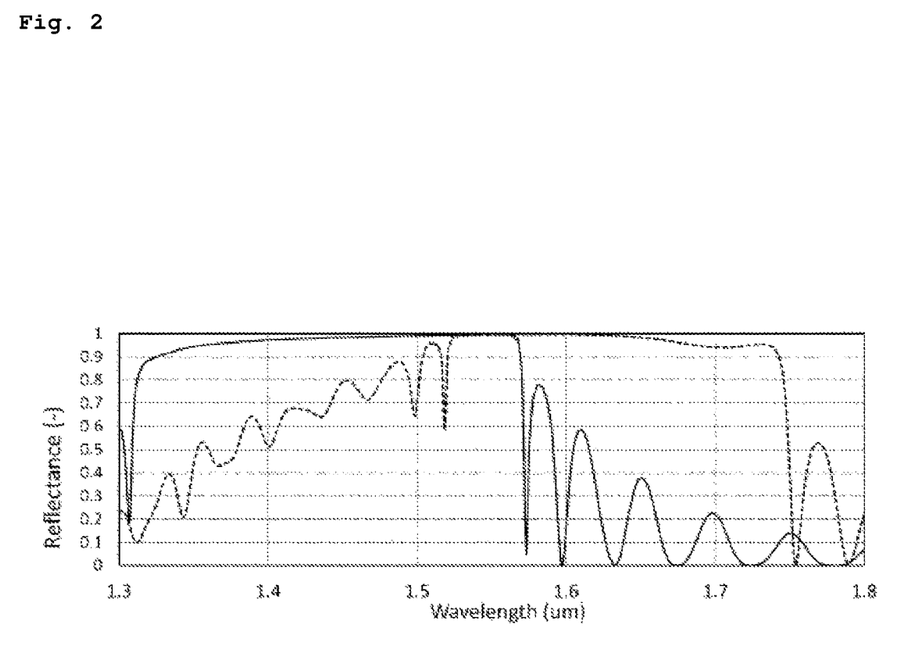
FIG. 2 is a characteristic diagram showing an overlap between a stop band of a first reflecting section 101 and a stop band of a second reflecting section 102.

According to the embodiment, the lattice constant of the first reflecting section 101 and the lattice constant of the second reflecting section 102 are differentiated from each other so that resonance only occurs in a portion where the stop band of the first reflecting section 101 and the stop band of the second reflecting section 102 overlap with each other (refer to FIG. 2). As a result, an optical resonator of the optical device according to the embodiment only resonates in a single mode. It should be noted that, in FIG. 2, a state of the first reflecting section 101 is depicted by a dotted line and a state of the second reflecting section 102 is depicted by a solid line.

In addition to the above, in each of the first reflecting section 101 and the second reflecting section 102, a lattice constant and a diameter of a lattice element at an end on a side of the confining section 103 can be modulated as deemed appropriate. Adopting such a configuration minimizes radiation loss at a stop band short wave end in the first reflecting section 101 with a large lattice constant and at a stop band long wave end in the second reflecting section 102 with a small lattice constant, and a Q factor of the single mode described above can be increased.

Single mode resonance will now be described more specifically. A position of a stop band of a reflecting section by a one-dimensional photonic crystal can be controlled by adjusting a lattice constant of the reflecting section. By increasing the lattice constant of one reflecting section while reducing the lattice constant of the other reflecting section, a reflecting section that is biased toward a long wavelength side and a reflecting section that is biased toward a short wavelength side can be respectively realized. Light is reflected by the two reflecting sections only in a wavelength region (an overlapping stop band) where the two overlap with each other to be confined in a confining section that constitutes an interior of the resonator.

In the resonance structure described above, a configuration is adopted which causes a width of the overlapping stop band to be twice or less of the FSR so that only a single mode is positioned inside the overlapping stop band. Where the single resonant mode is positioned in the overlapping stop band can be controlled by appropriately adjusting a distance between the two reflecting sections or, in other words, a length of the confining section (resonator length).

Next, an increase in the Q factor due to a reduction in radiation loss will be described more specifically. Generally, there is a mode mismatch between a transverse mode of light in a region (confining section) between two reflecting sections and a transverse mode of light (Bloch mode) inside the reflecting sections, and a radiation loss is created due to the mismatch. Since the mismatch causes the Q factor of a resonator to drop, reducing the mode mismatch is important.

In order to reduce the mismatch, a lattice constant and a diameter of a lattice element of the photonic crystal are locally modulated at a confining section-side end of the reflecting sections. For example, a configuration is adopted in which, with respect to three lattice elements on the side of the confining section, the closer to the confining section, the smaller the diameter and the smaller the lattice constant of the lattice elements.

For example, in the example described above, as shown in FIG. 3, lattice constants of three first lattice elements 105 on the side of the confining section 103 in the first reflecting section 101 is set to 455 nm. In addition, diameters of the first lattice elements 105 are set to 120 nm, 140 nm, and 160 nm from a side adjacent to the confining section 103. Furthermore, diameters of the first lattice elements 105 on a distant side are commonly set to 180 nm.

Figure 3:
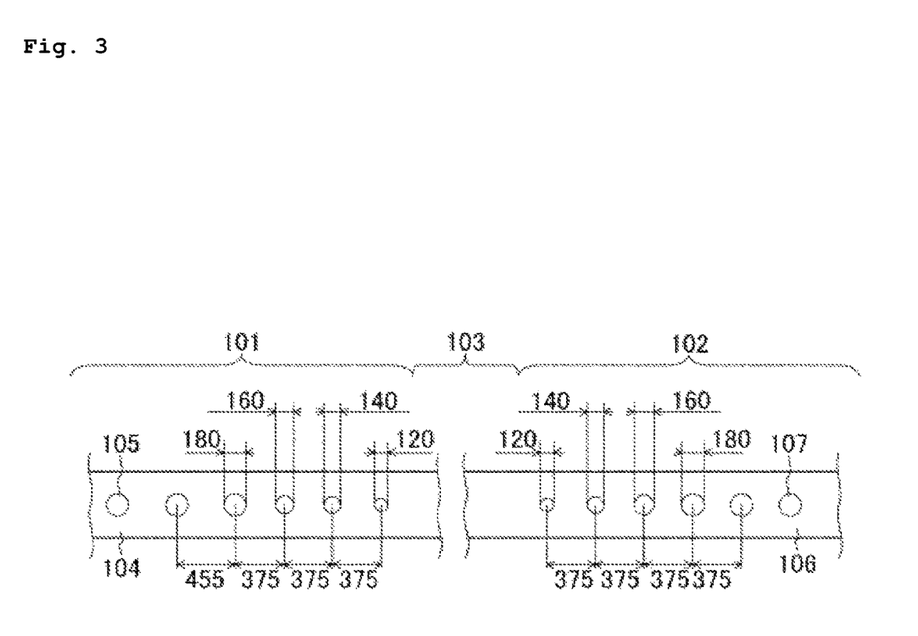
FIG. 3 is a configuration diagram showing a partial configuration of the optical device according to the embodiment of the present invention.

On the other hand, diameters of three second lattice elements 107 on the side of the confining section 103 in the second reflecting section 102 are set to 120 nm, 140 nm, and 160 nm from a side adjacent to the confining section 103. Furthermore, diameters of the second lattice elements 107 on a distant side are commonly set to 180 nm.

A wavelength region in the stop band of a photonic crystal in which a mode mismatch is minimized is determined by how a confining section-side end of the reflecting section is modulated. There is no structure capable of reducing a mode mismatch over an entire wavelength region in the stop band of a photonic crystal. As a result of calculations performed on this point, the follow tendencies were revealed.

A mismatch on a long wavelength side in the stop band is reduced by gradually reducing only the diameter of the lattice elements.

A mismatch on a short wavelength side in the stop band is reduced by gradually reducing the diameter of the lattice elements and, in addition, reducing lattice constants.

According to the modulation method described above, loss can be reduced on the long wavelength side in a reflecting section of which only diameters of lattice elements are reduced in stages but, on the other hand, loss can be reduced on the short wavelength side in a reflecting section of which diameters of lattice elements are reduced in stages and, in addition thereto, lattice constants are also reduced. As a result, a resonator can be realized in which loss is minimized in the overlapping stop band region of two reflecting sections.

Figure 4:
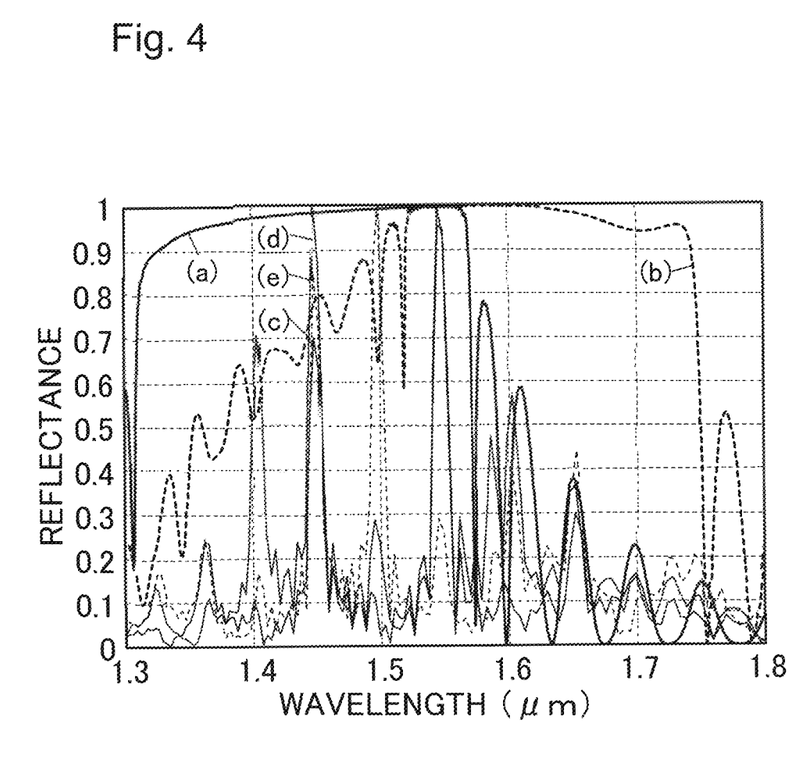
FIG. 4 is a characteristic diagram showing a resonator spectrum when a distance between the first reflecting section 101 and the second reflecting section 102 is set to 5.18 μm.

FIG. 4 shows a resonator spectrum when a distance between the first reflecting section 101 and the second reflecting section 102 is set to 5.18 μm. (a) represents a spectrum of the stop band of the second reflecting section 102 and (b) represents a spectrum of the stop band of the first reflecting section 101. In addition, (c), (d), and (e) represent resonance spectra at different locations in the confining section 103. These are results of calculations according to a three-dimensional FDTD (Finite Difference Time Domain) method.

It is shown that only one resonance mode is present in an overlapping region ( ) between the stop band of the first reflecting section 101 and the stop band of the second reflecting section 102. As a result of the calculation, a high Q factor of around 30,000 is obtained. On the other hand, as a result of the calculation, it was revealed that the Q factor in a non-overlapping region only reaches around 1,000 due to large loss. In this manner, with the optical device according to the embodiment, a resonator can be made into a quasi-single mode resonator in which only a single longitudinal mode has an overwhelmingly high Q factor.

Figure 5:
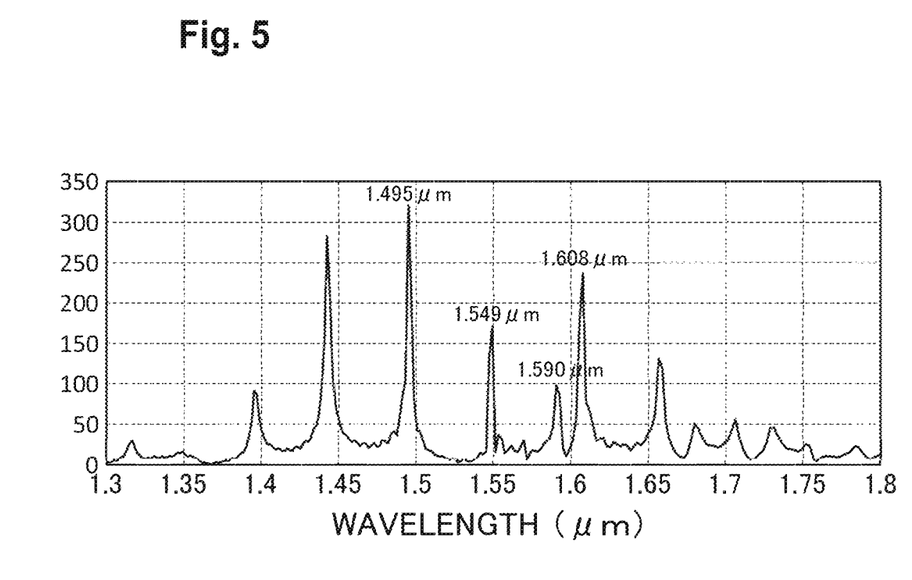
FIG. 5 is a characteristic diagram showing an electric field spectrum when a resonator is excited by a wide-band light source in a case where the distance between the first reflecting section 101 and the second reflecting section 102 is set to 5.18 μm, a waveguide width of the first reflecting section 101 and the second reflecting section 102 is set to 500 nm, a waveguide width of a confining section 103 is set to 600 nm, and lengths between the first and second reflecting sections 101 and 102 and the confining section 103 are subjected to width conversion by a 400 nm-long linear taper.

In addition, FIG. 5 shows an electric field spectrum when a resonator is excited by a wide-band light source in a case where the distance between the first reflecting section 101 and the second reflecting section 102 is set to 5.18 μm, a waveguide width of the first reflecting section 101 and the second reflecting section 102 is set to 500 nm, a waveguide width of a confining section 103 is set to 600 nm, and lengths between the first and second reflecting sections 101 and 102 and the confining section 103 are subjected to width conversion by a 400 nm-long linear taper. It is shown that a peak with a resonance wavelength of 1.549 μm is present around a wavelength of 1.55 μm which is a region where the stop band of the first reflecting section 101 and the stop band of the second reflecting section 102 overlap with each other.

Figure 6:
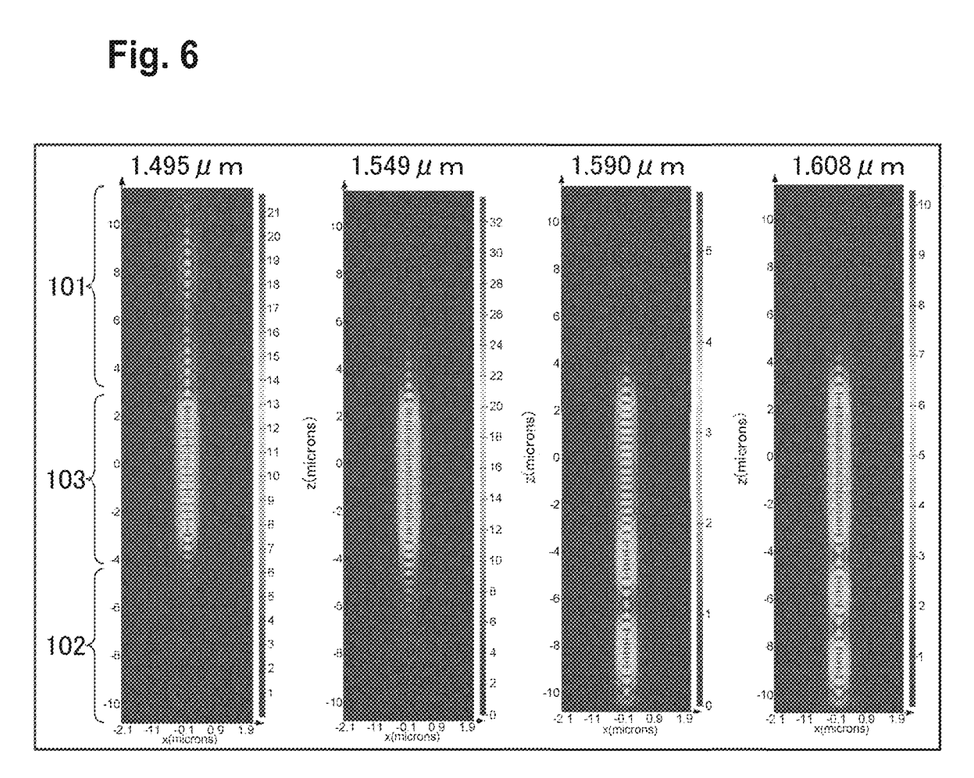
FIG. 6 is a distribution diagram showing a state of optical confinement in each part of the optical device according to the embodiment of the present invention.

Next, a state of optical confinement in each part of the optical device according to the embodiment is shown in FIG. 6. It is shown that, at a wavelength of 1.495 μm, a mode distribution leaks into the first reflecting section 101. It is also shown that, at wavelengths of 1.590 μm and 1.608 μm, the mode distribution leaks into the second reflecting section 102. By contrast, it is shown that, at a wavelength of 1.549 μm, the mode distribution does not leak from the confining section 103. In this manner, according to the embodiment, an optical confinement coefficient can be suppressed. Reducing the Q factor and the optical confinement coefficient of other modes which are desirably prevented from reaching oscillation is important in suppressing multimode oscillation in a semiconductor laser.

Figure 7:
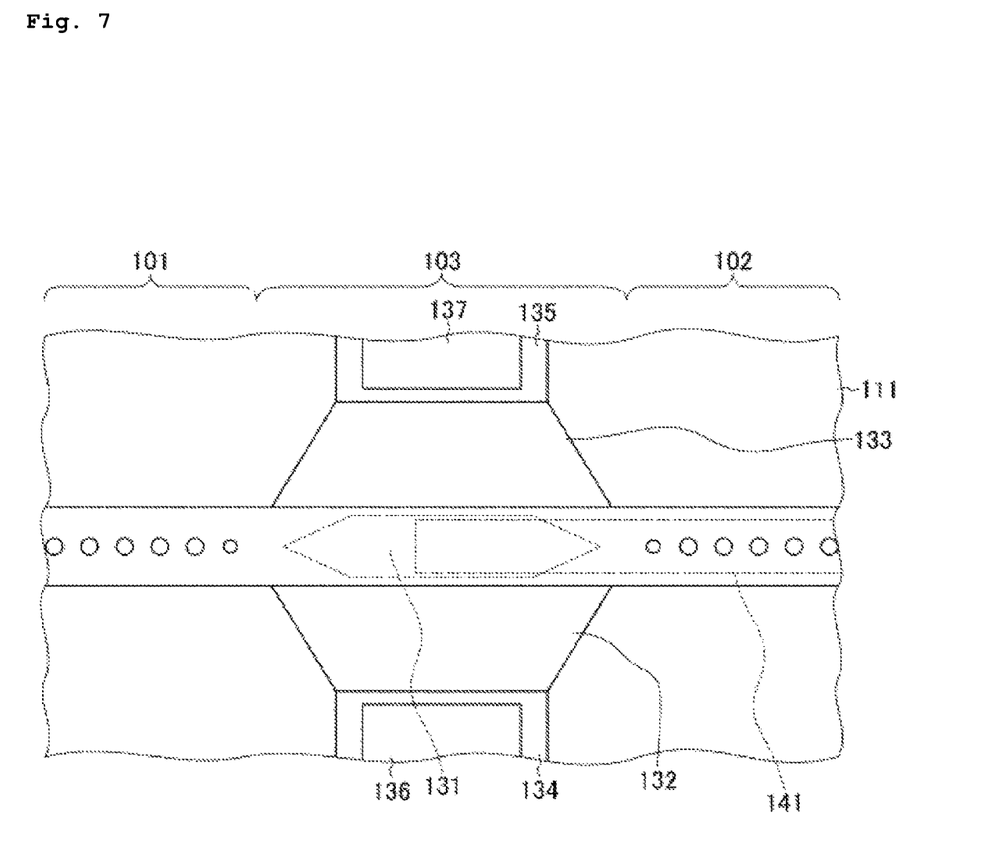
FIG. 7 is a plan view showing a configuration of a semiconductor laser being an application example of the optical device according to the embodiment of the present invention.

Next, a case where the optical device according to the embodiment is applied to a semiconductor laser will be described with reference to FIG. 7. In the semiconductor laser, an active layer 131 is embedded in the confining section 103. The optical device includes a clad layer 111, and the first reflecting section 101, the confining section 103, and the second reflecting section 102 are formed on the clad layer 111. In addition, an n-type semiconductor layer 132 and a p-type semiconductor layer 133 which are parallel to a face of the clad layer 111 in a direction perpendicular to a guiding direction and formed with the confining section 103 therebetween are provided. By making a thickness of the n-type semiconductor layer 132 and the p-type semiconductor layer 133 thinner than the confining section 103, the confining section 103 can be given a rib-type waveguide structure in order to realize strong optical confinement by the confining section 103 and low-loss optical coupling between the confining section 103 and the first and second reflecting sections 101 and 102.

For example, the clad layer 111 is constituted of silicon oxide. For example, a silicon oxide layer formed on a substrate such as Si can be adopted as the clad layer 111. The first reflecting section 101, the confining section 103, and the second reflecting section 102 are constituted of, for example, a group III-V compound semiconductor such as InP. For example, the first reflecting section 101, the confining section 103, and the second reflecting section 102 can be formed by depositing InP on the clad layer 111 using known metal-organic chemical vapor deposition.

The active layer 131 has a length in the guiding direction of around several μm, has a central portion of which an external shape is, for example, an approximately cuboid shape, and has a shape in which both ends in the guiding direction taper toward the tips. It should be noted that the guiding direction is a left-right direction on a paper plane in FIG. 7. In this manner, by adiabatically changing shapes of both ends of the active layer 131, a decline in optical coupling efficiency, an occurrence of unnecessary reflection, and the like at both ends of the active layer 131 can be suppressed.

The n-type semiconductor layer 132 and the p-type semiconductor layer 133 are arranged with the confining section 103 interposed therebetween. For example, the n-type semiconductor layer 132 is constituted of, for example, an n-type group III-V compound semiconductor such as n-type InP. In addition, for example, the p-type semiconductor layer 133 is constituted of, for example, a p-type group III-V compound semiconductor such as p-type InP.

Furthermore, an n-type contact layer 134 connected to the n-type semiconductor layer 132 and a p-type contact layer 135 connected to the p-type semiconductor layer 133 are provided, and the n-type contact layer 134 is constituted of an n-type group III-V compound semiconductor such as n-type InP. In addition, the p-type contact layer 135 is constituted of a p-type group III-V compound semiconductor such as p-type InP. Furthermore, an n-electrode 136 that is electrically connected to the n-type contact layer 134 and a p-electrode 137 that is electrically connected to the p-type contact layer 135 are provided.

The n-type semiconductor layer 132, the p-type semiconductor layer 133, the n-type contact layer 134, the p-type contact layer 135, the n-electrode 136, and the p-electrode 137 constitute a current injection structure.

The first reflecting section 101, the confining section 103, the second reflecting section 102, the n-type semiconductor layer 132, the p-type semiconductor layer 133, the n-type contact layer 134, and the p-type contact layer 135 are integrally formed.

By adopting a structure in which a resonator is formed by the first reflecting section 101, the confining section 103, and the second reflecting section 102 and light is confined in the confining section 103, the optical device can be caused to operate as a current injection-type semiconductor laser. Due to the current injection structure, the optical device operates as a laser diode by applying a current with a forward bias to the confining section 103. In addition, by forming an Si core 141 which is closely arranged on a lower layer side of the second reflecting section 102 in an optically coupleable range, oscillating light can be extracted using an optical waveguide created by the Si core 141.

Figure 8:
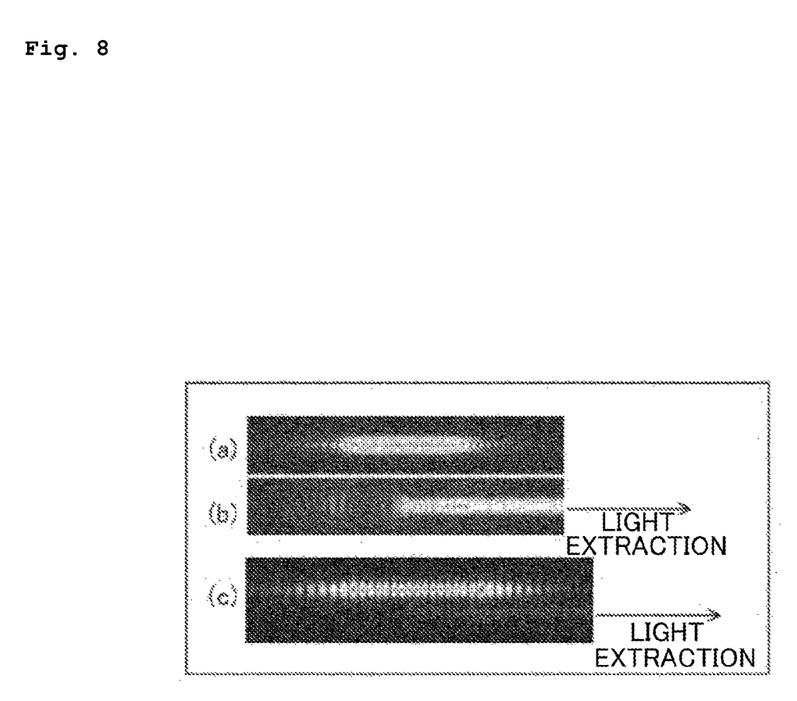
FIG. 8 is a distribution diagram showing a state of optical confinement in each part of the semiconductor laser illustrated using FIG. 7.

FIG. 8 shows a state of optical confinement in each part. (a) in FIG. 8 shows a state in the confining section 103 in a plan view. (b) in FIG. 8 shows a state in the optical waveguide created by the Si core 141 in a plan view. (c) in FIG. 8 shows an optical confinement state in the confining section 103 in a sectional view. A state is shown in which light is extracted from the confining section 103 in which the active layer 131 is embedded to the optical waveguide created by the Si core 141 in a lower layer of the active layer 131.

Since the semiconductor laser described above uses the first reflecting section 101 and the second reflecting section 102, three conditions of a strong optical confinement, a high Q factor, and a single mode property are realized and a single mode oscillation operation can be performed with extremely low power.

As described above, since a resonator is constituted by a first reflecting section constituted of a thin-wire waveguide-type one-dimensional photonic crystal and a second reflecting section constituted of a thin-wire waveguide-type one-dimensional photonic crystal of which a lattice constant differs from that of the first reflecting section, a resonator using a thin-wire waveguide-type one-dimensional photonic crystal as a reflecting section enables single mode resonance to be performed.

It is to be understood that the present invention is not limited to the embodiment described above and that many modifications and combinations will obviously occur to those with ordinary skill in the art without departing from the technical scope of the present invention.

REFERENCE SIGNS LIST

101 First reflecting section
102 Second reflecting section
103 Confining section
104 First base
105 First lattice element
106 Second base
107 Second lattice element.

The invention claimed is:

1. A Fabry-Perot optical resonator comprising:
a first reflecting section including a first photonic crystal;
a second reflecting section including a second photonic crystal, the second photonic crystal having a different lattice constant than the first photonic crystal; and
a confining section between the first reflecting section and the second reflecting section, wherein each of the first reflecting section and the second reflecting section includes lattice elements, wherein three lattice elements provided on the side of the confining section in each of the first reflecting section and the second reflecting section have progressively smaller diameters as they get closer to the confining section, and wherein three lattice elements on the side of the confining section in only the first reflecting section have progressively smaller lattice constants as they get closer to the confining section, such lattice constants being less than a lattice constant of other lattice elements in the first reflecting section.

2. The Fabry-Perot optical resonator according to claim 1, wherein the first photonic crystal is a thin-wire waveguide-type one-dimensional photonic crystal.

3. The Fabry-Perot optical resonator according to claim 1, wherein the second photonic crystal is a thin-wire waveguide-type one-dimensional photonic crystal.

4. The Fabry-Perot optical resonator according to claim 1, further comprising a light-emitting device arranged in the confining section.

5. The Fabry-Perot optical resonator according to claim 4, wherein the light-emitting device is a light-emitting diode.

6. The Fabry-Perot optical resonator according to claim 1, further comprising:
an active layer arranged in the confining section; and
a current injection structure configured to inject a current into the confining section.

7. The Fabry-Perot optical resonator according to claim 6, wherein the current injection structure includes an n-type semiconductor layer and a p-type semiconductor layer arranged with the confining section interposed therebetween.

8. The Fabry-Perot optical resonator according to claim 1, wherein a first end of the confining section is coupled to the first reflecting section, and wherein a second end of the confining section is coupled to the second reflecting section.

9. The Fabry-Perot optical resonator according to claim 1, wherein the first reflecting section, the second reflecting section and the confining section are constituted of a group III-V compound semiconductor.

10. An optical device including a Fabry-Perot optical resonator comprising:
a first reflecting section including a first thin-wire waveguide-type one-dimensional photonic crystal;
a second reflecting section including a second thin-wire waveguide-type one-dimensional photonic crystal, the second thin-wire waveguide-type one-dimensional photonic crystal having a lattice constant of which differs from that of the first thin-wire waveguide-type one-dimensional photonic crystal; and
a confining section sandwiched between the first reflecting section and the second reflecting section, wherein each of the first reflecting section and the second reflecting section includes lattice elements, wherein three lattice elements provided on the side of the confining section in each of the first reflecting section and the second reflecting section have progressively smaller diameters as they get closer to the confining section, and wherein three lattice elements on the side of the confining section in only the first reflecting section have progressively smaller lattice constants as they get closer to the confining section, such lattice constants being less than a lattice constant of other lattice elements in the first reflecting section.

11. The optical device according to claim 10, further comprising a light-emitting device arranged in the confining section.

12. The optical device according to claim 11, wherein the light-emitting device is a light-emitting diode.

13. The optical device according to claim 10, further comprising:
   an active layer arranged in the confining section; and
   a current injection structure configured to inject a current into the confining section.

14. The optical device according to claim 13, wherein the current injection structure includes an n-type semiconductor layer and a p-type semiconductor layer arranged with the confining section interposed therebetween.

15. The optical device according to claim 10, wherein a first end of the confining section is coupled to the first reflecting section, and wherein a second end of the confining section is coupled to the second reflecting section.

16. The optical device according to claim 10, wherein the first reflecting section, the second reflecting section and the confining section are constituted of a group III-V compound semiconductor.

\* \* \* \* \*